(12) United States Patent
Hiroyuki

(10) Patent No.: US 11,122,192 B2
(45) Date of Patent: Sep. 14, 2021

(54) DOME CAMERA

(71) Applicant: Axis AB, Lund (SE)

(72) Inventor: Ide Hiroyuki, Tokyo (JP)

(73) Assignee: Axis AB, Lund (SE)

( * ) Notice: Subject to any disclaimer, the term of this patent is extended or adjusted under 35 U.S.C. 154(b) by 0 days.

(21) Appl. No.: 16/792,479

(22) Filed: Feb. 17, 2020

(65) Prior Publication Data

US 2020/0267294 A1 Aug. 20, 2020

(30) Foreign Application Priority Data

Feb. 20, 2019 (EP) .................................... 19158264

(51) Int. Cl.
| | |
|---|---|
| *H04N 5/225* | (2006.01) |
| *G03B 17/02* | (2021.01) |
| *G03B 37/02* | (2021.01) |
| *H04N 5/232* | (2006.01) |
| *G03B 17/56* | (2021.01) |
| *H04N 7/18* | (2006.01) |

(52) U.S. Cl.
CPC ........... *H04N 5/2254* (2013.01); *G03B 17/02* (2013.01); *G03B 17/561* (2013.01); *G03B 37/02* (2013.01); *H04N 5/2252* (2013.01); *H04N 5/23238* (2013.01); *H04N 7/18* (2013.01)

(58) Field of Classification Search
CPC .............. H04N 5/2254; H04N 5/2252; H04N 5/23238; H04N 7/18; H04N 5/2251; H04N 5/2253; G03B 37/02; G03B 17/02; G03B 17/561
See application file for complete search history.

(56) References Cited

U.S. PATENT DOCUMENTS

| | | | |
|---|---|---|---|
| 5,793,537 A | 8/1998 | Nomura et al. | |
| 8,204,371 B2 | 6/2012 | Chen | |
| 8,305,446 B2 | 11/2012 | Mizuno | |
| 2005/0168846 A1* | 8/2005 | Ye | H04N 5/2253 359/819 |

(Continued)

FOREIGN PATENT DOCUMENTS

| | | |
|---|---|---|
| CN | 103149774 A | 6/2013 |
| CN | 205049849 U | 2/2016 |

(Continued)

OTHER PUBLICATIONS

Extended European Search Report dated Aug. 19, 2019 for the European Patent Application No. 19158264.2.

*Primary Examiner* — Abdelaaziz Tissire
(74) *Attorney, Agent, or Firm* — Volpe Koenig

(57) ABSTRACT

A camera comprising a housing, a lens, a lens holder and an image sensor is provided. The image sensor is supported by the lens holder. The lens holder comprises a through-going channel configured to coaxially and lockably receive the lens in a position in which a rear end of the lens faces the image sensor. The lens holder is spring loaded in relation to the housing by an elastic member arranged in a position between the housing and the lens holder into a position in which a front portion of the lens is forced into abutment with a first lens stop arranged in the housing, thereby providing a fixed axial distance between a front end of the lens and a front end of the housing.

9 Claims, 2 Drawing Sheets

(56) References Cited

U.S. PATENT DOCUMENTS

| | | | |
|---|---|---|---|
| 2007/0009246 A1* | 1/2007 | Lee | G02B 7/04 |
| | | | 396/72 |
| 2012/0062789 A1 | 3/2012 | Sasaki | |
| 2013/0162894 A1* | 6/2013 | Lee | G02B 21/362 |
| | | | 348/373 |
| 2017/0307841 A1 | 10/2017 | Nakamura et al. | |

FOREIGN PATENT DOCUMENTS

| | | |
|---|---|---|
| EP | 2078982 B1 | 4/2011 |
| GB | 2458781 A | 10/2009 |
| JP | 2004 094003 A2 | 3/2004 |
| WO | 2019/183604 A1 | 9/2019 |

* cited by examiner

DOME CAMERA

TECHNICAL FIELD

The present invention refers to a dome camera comprising a housing, a lens holder, a lens, and an image sensor.

TECHNICAL BACKGROUND

Surveillance cameras are typically arranged in areas where they may be subjected to an external violence trying to damage the camera. One type of surveillance cameras are those of the dome type, where a translucent dome provides a protective casing while still allowing a wide surveillance field. To prevent the surveillance camera from exterior violence, all exterior components, such as the dome and the mounting base should be made impact resistant. As one measure, it is often preferred that there is a distance between the inner wall of the dome and the front of the lens. The distance will protect the lens in the event the dome should be broken or indented. Also, the distance should allow the camera to be tilted inside the dome while still maintaining a fixed distance between the free end of the lens and the inner surface of the dome. In the event the camera is of the type where the lens is interchangeable, this may cause a problem since, if the lens should be changed into a shorter or longer lens, the distance between the free end of the lens and the inner surface of the dome will be changed. Especially, if the lens is changed into a longer one, the free end of the lens will come closer to the inner wall of the dome. The straight forward solution would simply be to design the housing so that the free end of the original lens, i.e. the standard lens, is arranged further away from the dome to thereby allow an extra space to accommodate also a longer lens. This is however not a satisfactory solution since the distance between the lens and the inner surface of the dome as a rule of thumb should be kept short in order to avoid reflections. Also, a larger housing adds to the bulkiness of the housing.

US 2012/0062789A1 discloses an imaging apparatus with an elastically supported lens unit. The lens unit can perform a retreat operation in an opposite direction from an object and along an optical axis direction of the lens unit when a force is applied thereto from a dome cover.

WO2019/183604A1, having a filing date prior to the filing date of the present application, but published afterwards and hence being relevant to novelty only, discloses a self-aligning lens holder which includes elements that register against an image sensor chip to align the holder and lens with the chip.

There is hence a need for a camera that allows an interchangeable lens while still allowing the distance between the free end of the lens and the inner surface of the dome to be fixed.

SUMMARY

Providing a surveillance camera of the dome type where the lens is easily interchangeable while at the same time allowing the distance between the free end of the lens and the inner surface of the dome to be fixed would be beneficial.

Disclosed hereinafter is a dome camera comprising a housing, a lens, a lens holder and an image sensor, wherein:
the image sensor is supported by the lens holder;
the lens holder comprises a through-going channel configured to coaxially and lockably receive the lens in a position in which a rear end of the lens faces the image sensor;
the lens holder is spring loaded in relation to the housing by an elastic member arranged in a position between the housing and the lens holder into a position in which a front portion of the lens is forced into abutment with a first lens stop arranged in the housing, thereby providing a fixed axial distance between a front end of the lens and a front end of the housing.

Accordingly, a dome camera is provided wherein the lens, independently of its length, in a condition when mounted to the housing allows a fixed distance between the rear end of the lens and the image sensor. Further, as a consequence of the fact that the lens holder which supports the lens is spring loaded in relation to the housing towards a physical stop, also the axial distance between a front end of the lens and a front end of the housing will be fixed. Thereby, when a dome is attached to the housing to cover and protect the camera, the distance between the free front end of the lens and the inner surface of the dome will always be the same. As a result, there is no need for any time consuming calibration in case the lens should be changed. Further, the housing with lens and lens holder may be handled as one unit which easily may be dissembled from the dome and mount, serviced and re-assembled. Accordingly, a versatile camera is provided where one and the same housing may be used together with different lens lengths.

The housing may comprise a through-going channel configured to coaxially receive a portion of the lens holder, and wherein the first lens stop is arranged in a front portion of the housing encircling a mouth of said through-going channel. The housing may be formed as a unitary body or be composed of different interconnected parts.

The front portion of the lens may be configured to project past a front end of the lens holder in a condition when the lens is lockably received in the lens holder, and wherein the front portion comprises a radially extending flange, a rear portion thereof being configured to abut the first lens stop as a result of the lens holder being spring loaded. The front portion of the lens may be arranged to be at least partly or fully received in the through-going channel of the housing, thereby contributing to protecting the lens from any external violence.

The lens may be configured to be lockably received in the through-going channel by a threaded engagement between an inner envelope surface of the through-going channel and an outer envelope surface of the lens. It is to be understood that the number of threads and/or their pitch may be adapted to the size of the camera and its lens. A set of lenses configured to be interchangeably used in the camera may be provided with a threaded portion along their respective outer envelope surfaces having one and the same axial length. Thereby the engagement length between the lens holder and the lens may be controlled to ensure a fixed position between the lens and the lens holder.

A rear end portion of the inner envelope surface of the through-going channel may comprise a second lens stop. The second lens stop may be used to restrict and thereby control the engagement length between the lens holder and the lens to ensure a fixed position between the lens and the lens holder.

The lens may be configured to be lockably received in the through-going channel by a bayonet coupling between an inner envelope surface of the through-going channel and an outer envelope surface of the lens. The use of a bayonet coupling is an alternative solution to using a threaded engagement between the lens and the lens holder. The bayonet coupling will per definition ensure a fixed position between the lens and the lens holder.

The elastic member may be a spring, preferably a coil spring or a leaf spring.

The housing may form part of a tilt unit. The tilt unit may be used to allow tilting of the housing in view of a camera mount and hence tilting of the lens in view of a dome to thereby cover an intended surveillance area.

Advantages will be obvious to a person skilled in the art reading the detailed description given below describing different embodiments.

BRIEF DESCRIPTION OF THE DRAWINGS

The embodiments will be described in detail with reference to the schematic drawings.

DETAILED DESCRIPTION

Figure 1:
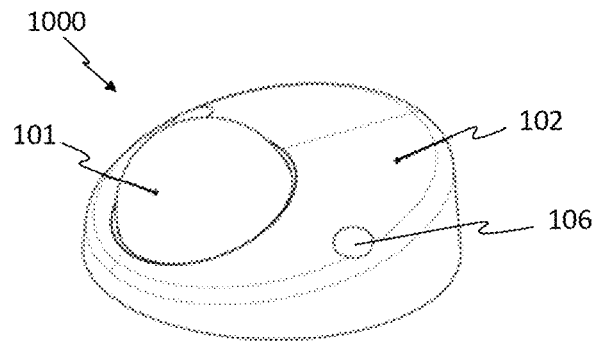
FIG. 1 discloses a perspective view of one example of a dome camera.
Figure 2:
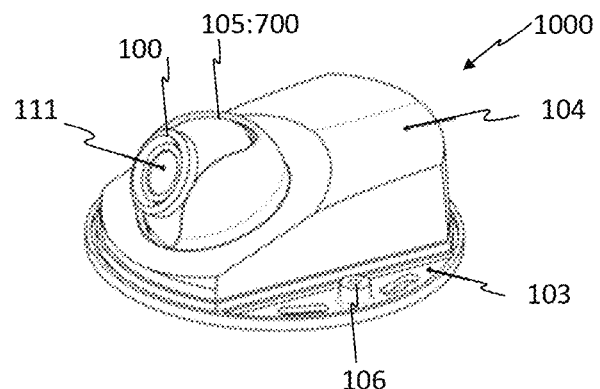
FIG. 2 discloses a perspective view of the dome camera of FIG. 1 with the outer casing and the dome removed.

Starting with FIGS. 1 and 2, perspective views of one typical example of a dome camera 1000 is disclosed. The dome camera 1000, as seen in use, comprises a protective outer casing 102 and a dome 101. In FIG. 2, the same dome camera 1000 is disclosed with the protective casing 102 and the dome 101 removed. The dome camera 1000 comprises a mounting plate 103 which is used to mount the dome camera 1000 to a support (not disclosed), such as a wall or ceiling. The mounting plate 103 is in the disclosed embodiment configured to be mounted to the support by means of screws of the like (not disclosed). The mounting plate 103 supports an inner casing 104 in which a camera 100 is received. A camera 100 is tiltably received in an arc shaped recess 105 forming part of a tilt unit 700. Tilting of a camera 100 is well known in the art and is not further discussed.

The outer casing 102 is configured to be mounted to the mounting plate 103 via screws (not disclosed) to be received in through-going holes 106 in the outer casing 102 and the mounting plate 103, respectively.

Figure 3:
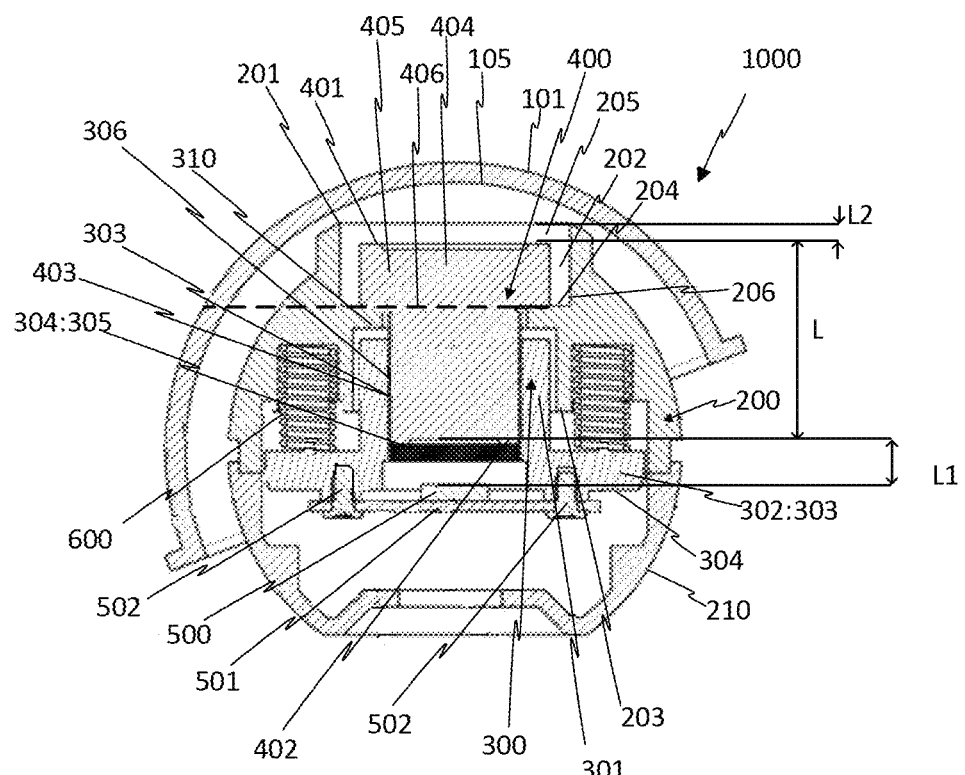
FIG. 3 discloses a sectional drawing of a dome camera in line with one embodiment.
Figure 4:
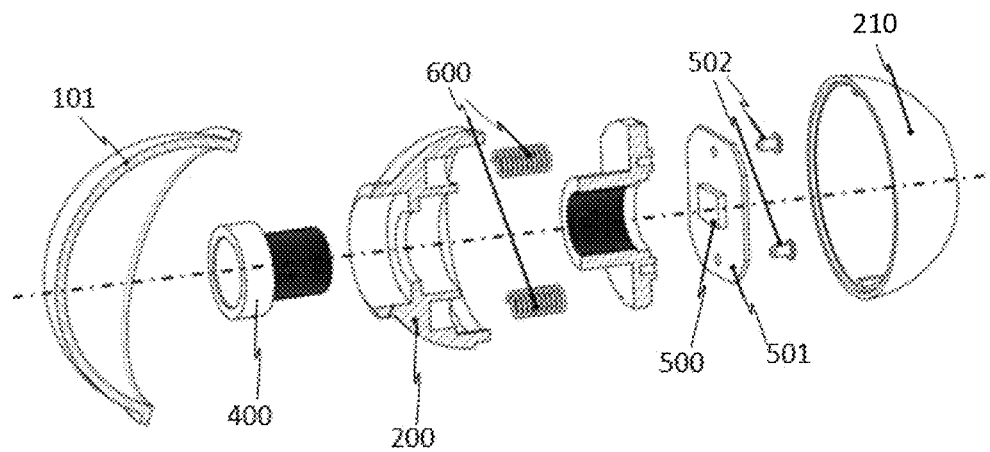
FIG. 4 discloses a schematic exploded view of the dome camera of FIG. 3.

Now turning to FIG. 3, a sectional drawing of relevant parts of the dome camera 1000 is disclosed. Also, an exploded view of parts of the dome camera 1000 is disclosed in FIG. 4.

To facilitate the following disclosure, the terms front and rear will be used. The term "front" is to be understood as an end configured to face an object to be imaged when using the dome camera. In the corresponding way, the term "rear" is to be understood as an end configured to face away from an object to be imaged when using the dome camera, or in other words facing generally towards a mounting surface for the dome camera.

Further, in the context of this disclosure, the term "lens" should be understood as a camera lens.

Additionally, in the context of the lens, the term "length" L should be understood as the axial distance between an outermost rear end of the lens and an outermost front end of the lens.

The camera 1000 basically comprises a housing 200 in which a lens holder 300 supporting a lens 400 and an image sensor 500 is arranged. The lens holder 300 is spring loaded in relation to the housing 200 into a position in which there is a fixed axial distance L2 between a front end 401 of the lens 400 and a front end 201 of the housing 200. By the lens holder 300 supporting the image sensor 500, there is a fixed axial distance L1 between a rear end 402 of the lens 400 and the image sensor 500. This applies no matter the length L of the lens 400 that is arranged in the lens holder 300, as long as the lens 400 has a length L suitable for a specific camera type. Thereby, the camera 100 may be arranged in, e.g., a dome 101 while always ensuring a fixed distance between an inner wall surface 105 of the dome 101 and the front end 401 of the lens 400.

The housing 200 comprises a body which, e.g., is formed by injection molding a plastic material or by casting a metal material, such as aluminum. The housing 200 comprises a through-going channel 202 having an axial extension from a front end 201 to a rear end 203. The through-going channel 202 is configured to coaxially receive a portion of the lens holder 300 to be described below.

A first lens stop 204 is arranged in a front portion 206 of the housing 200 encircling a mouth 205 of said through-going channel 202. In the disclosed embodiment, the first lens stop 204 is formed as a substantially flat surface having a radial extension.

The rear end 203 of the housing 200 is closed by a lid 210. It is to be understood that the lid 210 may be omitted.

The lens holder 300 comprises a body which, e.g., is formed by injection molding a plastic material or by casting a metal material, such as aluminum.

The lens holder 300 comprises an axially extending neck portion 301. A rear end 302 of the neck portion 301 is provided with a radially extending flange 303. The image sensor 500, supported by a PCB 501 (Printed Circuit Board) is mounted to a rear surface 304 of the flange 303. The image sensor 500 is arranged to face the lens 400 to be supported by the lens holder 300.

The mounting of the PCB 501 to the lens holder 300 is made by screws 502. It is however to be understood that the mounting may be provided by using other arrangements such as adhesive or a snap-fit. The PCB 501 is configured to be operatively connected to a non-disclosed power supply.

The neck portion 301 of the lens holder 300 is configured to be coaxially received inside the through-going channel 202 of the housing 200.

The neck portion 301 comprises a through-going channel 306 configured to coaxially and lockably receive the lens 400 in a position in which the rear end 402 of the lens 400 faces the image sensor 500, and in which position a fixed axial distance L1 is formed between the rear end 402 of the lens 400 and the image sensor 500.

The lens 400 is lockably received in the through-going channel 306 of the lens holder 300 by a threaded engagement between an inner envelope surface 303 of the through-going-channel 306 of the lens holder 300 and an outer envelope surface 403 of the lens 400.

A rear end portion 304 of the inner envelope surface 303 of the through-going channel 306 comprises a second lens stop 305. The second lens stop 305 may by way of example be a projection or a seating (not disclosed). Alternatively, the second lens stop 305 may be the end of the longitudinal extension of the threaded envelope surface of the lens holder 300. When threading the lens 400 to the lens holder 300, the lens 400 is threaded until the rear end 402 of the lens 400 abuts the second lens stop 305. Thereby the fixed axial distance L1 between the rear end 402 of the lens 400 and the image sensor 500 will be ensured.

The lens 400 has an axial length L which is adapted so that a front portion 404 of the lens 400 is configured to project past a front end 310 of the lens holder 300 in a condition when the lens 400 is lockably received in the lens holder 300. The front portion 404 of the lens 400 comprises a radially extending flange 405. A rear portion 406 thereof is configured to abut the first lens stop 204 formed in the housing 200 to thereby restrict axial movement between the housing 200 and the lens holder 300.

The lens holder 300 is spring loaded in relation to the housing 200 by elastic members 600 which are arranged in a position between the housing 200 and the lens holder 300 into a position in which a front portion 404 of the lens 400 is forced into abutment with the first lens stop 204. Thereby a fixed axial distance L2 is provided between the front end 401 of the lens 400 and a front end 201 of the housing 200.

The spring loading is provided by a plurality of elastic members 600 that are arranged to act between the rear end 203 of the housing 200 and a front end of the flange 303 of the lens holder 300. The elastic members 600 are arranged to force the lens holder 300 in the axial direction in a direction away from the housing 200. The axial displacement is however restricted by the front portion 404 of the lens 400 abutting the first lens stop 204.

Figure 5A:
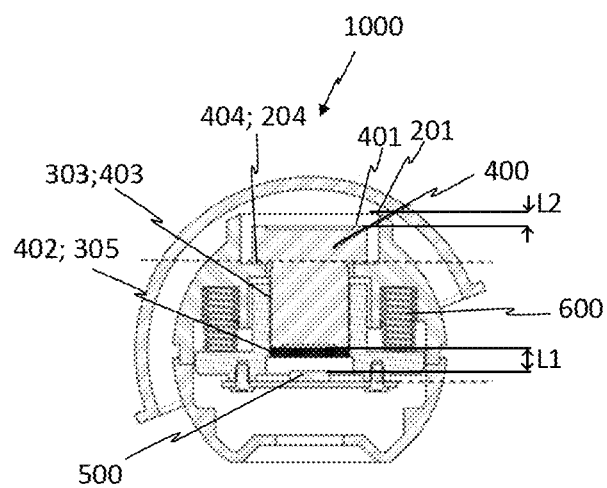
FIGS. 5A and 5B disclose sectional views of a dome camera of FIG. 3 with a short lens and a long lens, respectively.
Figure 5B:
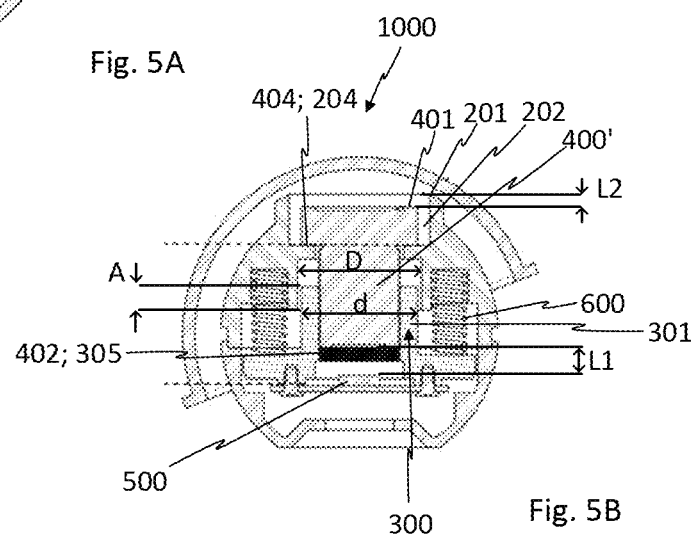

Now turning to FIGS. 5A and 5B, the interaction between the housing 200 and the lens holder 300 is disclosed when the lens holder is provided with lenses 400, 400' of different lengths L.

Starting with FIG. 5A, the camera 1000 is disclosed with a lens 400 having a "short" length. The lens 400 is mounted to the lens holder 200 by threading. The rear end 402 of the lens 400 abuts the second lens stop 305, whereby there is a fixed axial distance L1 provided between the rear end 402 of the lens 400 and the image sensor 500. The elastic members 600 that are arranged to act between the housing 200 and the lens holder 300 force the front portion 404 of the lens 400 to abut the first lens stop 204. Thereby, there is a fixed axial distance L2 provided between the front end 401 of the lens 400 and the front end 201 of the housing 200.

Now turning to FIG. 5B, the short lens used in FIG. 5A is replaced by a lens 400' having a "long" length. In all other aspects, the arrangement has the very same configuration. The lens 400' is mounted to the lens holder 300 so that the rear end 402 of the lens 400' abuts the second lens stop 305 whereby there is a fixed axial distance L1 provided between the rear end 402 of the lens 400' and the image sensor 500. The elastic members 600 force the rear end portion 404 of the lens 400' to abut the first lens stop 204 while being expanded in order to accommodate the longer lens 400'. Thus, the lens holder 300 is pushed further down in view of the housing 200. Still, as a result of the first end portion 404 of the lens 400' abutting the first lens stop 204, the axial distance L2 provided between the front end 401 of the lens 400 and the front end 201 of the housing 200 will remain being fixed.

As is noted, see FIG. 5B, the through-going channel 202 of the housing 200 has along an axial portion thereof, a diameter D that exceeds the outer diameter d of the neck portion 301 of the lens holder 300. Further, the through-going channel 202 of the housing 200 forms along a portion thereof an axial overlap A with the neck portion 301. Thereby the lens holder 300 will be allowed to freely move inside and along the through-going channel 202 of the housing 200 to accommodate different lengths L of lenses 400; 400'.

In the disclosed embodiment, the lens 400 has been described as being configured to be lockably received in the through-going channel 306 of the lens holder 300 by a threaded engagement between an inner envelope surface 303 of the through-going channel 306 and an outer envelope surface 403 of the lens 400. It is to be understood that other locking arrangements may be equally used. In one embodiment, not shown in the drawings, the lens 400 may be configured to be lockably received in the through-going channel by a bayonet coupling between an inner envelope surface of the through-going channel and an outer envelope surface of the lens. In the event of a bayonet coupling, the locking engagement will inherently form a second lens stop ensuring a fixed axial distance L1 between the rear end of the lens 400 and the image sensor 500.

The invention claimed is:

1. A dome camera comprising:
a housing, a lens, a lens holder and an image sensor, wherein:
the image sensor is supported by the lens holder;
the lens holder comprises a through-going channel configured to coaxially and lockably receive the lens in a position in which a rear end of the lens faces the image sensor;
the lens holder comprises an axially extending neck portion and a rear end of the neck portion is provided with a radially extending flange;
the image sensor is mounted to a rear surface of the radially extending flange such that the image sensor is arranged to face the lens supported by the lens holder; and
the lens holder is spring loaded in relation to the housing by an elastic member arranged in a position between the housing and the lens holder into a position in which a front portion of the lens is forced into abutment with a first lens stop arranged in the housing to provide a fixed axial distance between a front end of the lens and a front end of the housing.

2. The dome camera according to claim 1, wherein the housing comprises a through-going channel configured to coaxially receive a portion of the lens holder, and wherein the first lens stop is arranged in a front portion of the housing encircling a mouth of said through-going-channel.

3. The dome camera according to claim 2, wherein the front portion of the lens is configured to project past a front end of the lens holder in a condition when the lens is lockably received in the lens holder, and wherein the front portion comprises a radially extending flange, a rear portion thereof being configured to abut the first lens stop as a result of the lens holder being spring loaded.

4. The dome camera according to claim 1, wherein the front portion of the lens is configured to project past a front end of the lens holder in a condition when the lens is lockably received in the lens holder, and wherein the front portion comprises a radially extending flange, a rear portion thereof being configured to abut the first lens stop as a result of the lens holder being spring loaded.

5. The dome camera according to claim 4, wherein a rear end portion of the inner envelope surface of the through-going channel comprises a second lens stop.

6. The dome camera according to claim 1, wherein the lens is configured to be lockably received in the through-going channel by a threaded engagement between an inner envelope surface of the through-going channel and an outer envelope surface of the lens.

7. The dome camera according to claim 1, wherein the lens is configured to be lockably received in the through-going channel by a bayonet coupling between an inner envelope surface of the through-going channel and an outer envelope surface of the lens.

8. The dome camera according to claim 1, wherein the elastic member is a spring, preferably a coil spring or a leaf spring.

9. The dome camera according to claim 1, wherein the housing forms part of a tilt unit.

\* \* \* \* \*